(12) United States Patent
Kulchytskyy

(10) Patent No.: US 10,108,964 B2
(45) Date of Patent: Oct. 23, 2018

(54) SMART USER FEEDBACK

(71) Applicant: SugarCRM Inc., Cupertino, CA (US)

(72) Inventor: Vladyslav Kulchytskyy, Nashua, NH (US)

(73) Assignee: SugarCRM Inc., Cupertino, CA (US)

( * ) Notice: Subject to any disclaimer, the term of this patent is extended or adjusted under 35 U.S.C. 154(b) by 388 days.

(21) Appl. No.: 14/796,306

(22) Filed: Jul. 10, 2015

(65) Prior Publication Data
US 2017/0010759 A1    Jan. 12, 2017

(51) Int. Cl.
G06Q 30/00    (2012.01)

(52) U.S. Cl.
CPC ................... G06Q 30/01 (2013.01)

(58) Field of Classification Search
CPC .......... G06Q 10/10; G06F 3/00; G06F 9/4446
See application file for complete search history.

(56) References Cited

U.S. PATENT DOCUMENTS

| | | | | |
|---|---|---|---|---|
| 8,024,660 B1* | 9/2011 | Quinn | ............ | G06F 9/4446 715/745 |
| 9,583,019 B1* | 2/2017 | Schwartz | ............ | G09B 9/206 |
| 2004/0187029 A1* | 9/2004 | Ting | ............ | G06F 21/32 726/5 |
| 2005/0240538 A1* | 10/2005 | Ranganathan | ............ | G06Q 10/02 705/400 |
| 2005/0268234 A1* | 12/2005 | Rossi, Jr. | ............ | G06F 9/4446 715/705 |
| 2006/0026012 A1* | 2/2006 | Campbell | ............ | G06Q 10/10 702/182 |
| 2006/0156380 A1* | 7/2006 | Gladstone | ............ | G06F 21/52 726/1 |
| 2007/0157091 A1* | 7/2007 | Wadhwa | ............ | G06F 9/4446 715/705 |
| 2011/0125593 A1* | 5/2011 | Wright | ............ | G06Q 30/02 705/14.73 |
| 2011/0283189 A1* | 11/2011 | McCarty | ............ | H04N 5/44543 715/707 |
| 2013/0080892 A1* | 3/2013 | Okajo | ............ | G06F 9/4443 715/708 |
| 2014/0302818 A1* | 10/2014 | Fyke | ............ | G06F 21/32 455/411 |

* cited by examiner

Primary Examiner — Jennifer To
Assistant Examiner — Jasmine Wan
(74) Attorney, Agent, or Firm — Steven M. Greenberg, Esq.; Shutts & Bowen LLP

(57) ABSTRACT

Embodiments of the present invention provide a method, system and computer program product for smart user feedback. In an embodiment of the invention, a method for smart user feedback is provided. The method includes loading into memory of a computer hosting execution of an application, a set of nominal end user interactions with the application. The method also includes monitoring interactions with the application by an end user and comparing the monitored interactions with the set of nominal end user interactions in order to compute a threshold variance. Finally, the method includes responding to the threshold variance computed for the monitored interactions, by displaying a prompt in a display of the application in the computer recommending an initiation of a customer support session.

3 Claims, 2 Drawing Sheets

SMART USER FEEDBACK

BACKGROUND OF THE INVENTION

Field of the Invention

The present invention relates to customer support and more particularly to dynamic application end user support.

Description of the Related Art

Successful application deployment requires the deployment of a computer program that is largely free from run-time logical errors and the ready access to the computer program by the end user. Additionally, the way in which the computer program is effectively utilized by the end user must be plain to the end user so that the end user does not experience frustration in achieving the aim of the end user in using the computer program. So much is a tall order and oftentimes, despite the flawless production of a computer program and an equally flawless deployment, the success of the computer program falters due to problems with usability.

To overcome usability flaws inherent to a design of a computer program, a thorough program of end user support of the computer program is required. End user support ranges from simplistic online help to comprehensive online and printed documentation, to live telephone support provided by a call center. However, basic modes of customer support no longer suffice. Indeed, new technologies provide intermediate, independent management of customer support functions for many software publishers.

In this regard, third party services now act as a proxy for deployed applications, intercepting requests for customer support and providing an appropriate response through an appropriate medium. For instance, with regard to a Web deployed application, a time in which an end user lingers in a Web page without having made a selection is provided to a third party support service provider who in turn can direct the display of a dialog box prompting the end user to message a support request to the third party support service provider. The messaging mechanism can range from an email to a real-time instant messaging session. In some instances, a voice call can be initiated between the end user and a customer service representative of the third party support service provider.

Of import, though, given the separate relationship between software publisher and the third party support service provider, the end user support provided by the third party support service provider is limited to contemporaneous knowledge of the problems experienced by the end user and any record at the third party support service provider of past interactions with the end user. The ability to address the actions of the end user prior to the request for support with the third party support service provider, however, does not exist in so far as the third party support service provider is separate from the software publisher.

BRIEF SUMMARY OF THE INVENTION

Embodiments of the present invention address deficiencies of the art in respect to customer support for a computer program and provide a novel and non-obvious method, system and computer program product for smart user feedback. In an embodiment of the invention, a method for smart user feedback is provided. The method includes loading into memory of a computer hosting execution of an application, a set of nominal end user interactions with the application. The method also includes monitoring interactions with the application by an end user and comparing the monitored interactions with the set of nominal end user interactions in order to compute a threshold variance. Finally, the method includes responding to the threshold variance computed for the monitored interactions, by displaying a prompt in a display of the application in the computer recommending an initiation of a customer support session.

In one aspect of the embodiment, the method additionally includes monitoring different sequences of interactions with the application by multiple different other end users, identifying common ones of the sequences as nominal interactions for the application and storing the nominal interactions as the set of nominal end user interactions in fixed storage. In another aspect of the embodiment, the method additionally includes beginning the monitoring of the interactions with the application by an end user responsive to detecting a trigger event. In this regard, the trigger event is the end user consuming too much time without commanding the application, the end user repeatedly aborting a command in the application or the end user repeating a same command in the application, to name a few examples.

In another embodiment of the invention, a data processing is configured for smart user feedback. The system includes a host computing system that includes one or more computers, each with memory and at least one processor. The system also includes an application executing in the host computing system. Finally, the system includes a smart user feedback module coupled to the application. The module includes program code enabled to load into the memory of the host computing system a set of nominal end user interactions with the application, to monitor interactions with the application by an end user, to compare the monitored interactions with the set of nominal end user interactions in order to compute a threshold variance and to respond to the threshold variance computed for the monitored interactions, by displaying a prompt in a display of the application in the computer recommending an initiation of a customer support session.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for smart user feedback. In accordance with an embodiment of the invention, a set of nominal user interactions with an application is loaded into memory and a contemporaneous set of end user interactions of an end user with the application are monitored. The contemporaneous set of end user interactions is compared to the set of nominal user interactions. Responsive to a computation of threshold variation between the contemporaneous set of end user interactions and a set of nominal user interactions, a prompt can be displayed in the application recommending that the end user request online support, such as by transmitting a message to a customer service representative over a computer communications network, or by launching an instant messaging session between the end user and a customer service representative. In this way, proactive customer support can be initiated upon first inferring the end user experiencing a usability problem with the application by detecting a threshold variance between the set of end user interactions and the set of nominal user interactions.

Figure 1:
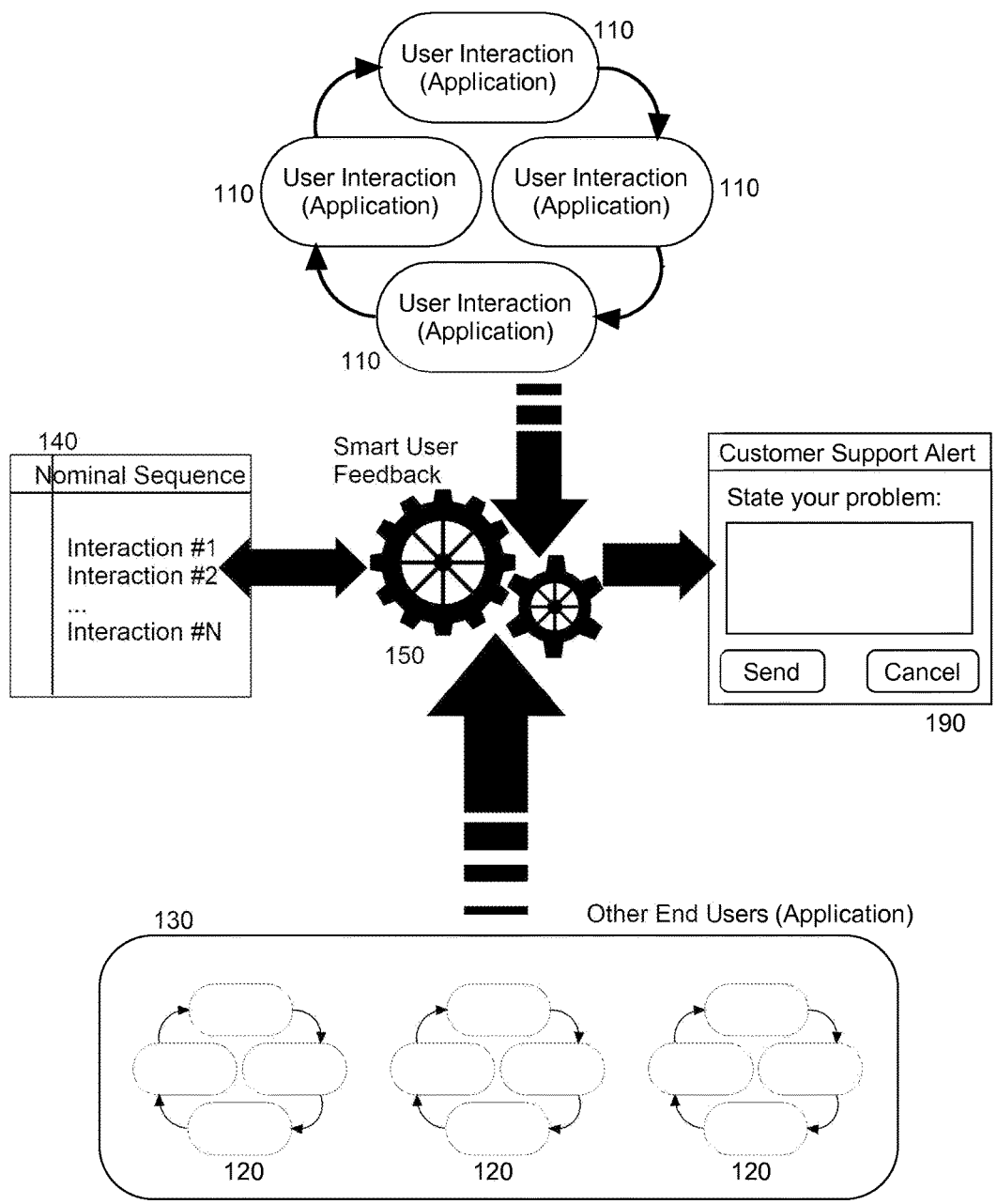
FIG. 1 is a pictorial illustration of a process for smart user feedback.

In illustration, FIG. 1 pictorially illustrates of a process for smart user feedback. As shown in FIG. 1, smart user feedback logic 150 monitors user interactions 110 between an end user and an application. The smart user feedback logic 150 compares the monitored user interactions 110 to a listing 140 of a nominal set of interactions. The listing 140 of the nominal set of instructions are established by monitoring other end user interactions 120 comparable to one another so as to produce a set of nominal end user interactions 130. The set of nominal end user interactions 130 then are included in the listing 140. Consequently, upon comparing the monitored user interactions 110 to those of the listing 140, the smart user feedback logic 150 responds to a threshold difference between the monitored user interactions 110 and the listing 140 by directing the display of a prompt 190 to the end user encouraging the end user to request customer support.

Figure 2:
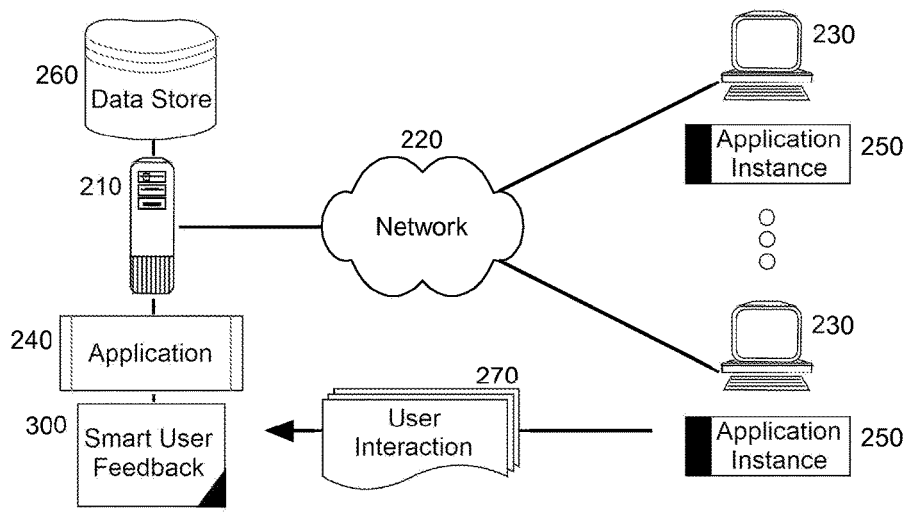
FIG. 2 is a schematic illustration of a data processing system configured for smart user feedback; and, FIG. 3 is a flow chart illustrating a process for smart user feedback.

The process illustrated in connection with FIG. 1 is implemented in a data processing system. In further illustration, FIG. 2 schematically shows a data processing system configured for smart user feedback. The system includes a host computing system 210 that includes one or more computers, each with memory and at least one processor. The host computing system 210 is communicatively coupled to different client computers 230 over computer communications network 220. The host computing system 210 supports the deployment of an application 240 to the client computers 230 over the computer communications network 220. In this regard, the deployment of the application 240 can include the execution of an application instance 250 of the application 240 in each of the client computers 230, of the deployment of the application 240 can include the display in each of the client computers 230 only a user interface to the application 240.

Notably, a smart user feedback module 300 is coupled to each of the application 240 and the application instances 250. In particular, the smart user feedback module 300 includes program code that executes either in the memory of the host computing system 210, or in the memory of each of the client computers 230 or in both with portions of the program code executing separately in the memory of the host computing system 210 and the memory of the client computers 230. In either circumstance, the program code is enabled to receive a set of monitored user interactions 270 from the different application instances 250.

For each of the application instances 250 of a corresponding one of the client computers 230, the program code determines if a threshold variance exists between the user interactions 270 of the application instance 250 and those in a listing of nominal interactions stored in data store 260 so as to indicate a behavior of a corresponding end user that differs from what is to be considered normal behavior in respect to end user utilization of the application. To the extent that a threshold variance exists, the program code of the smart user feedback module 300 directs a display of a prompt in the corresponding one of the client computers 230 seeking to provoke the end user into engaging in a customer support transaction.

Figure 3:
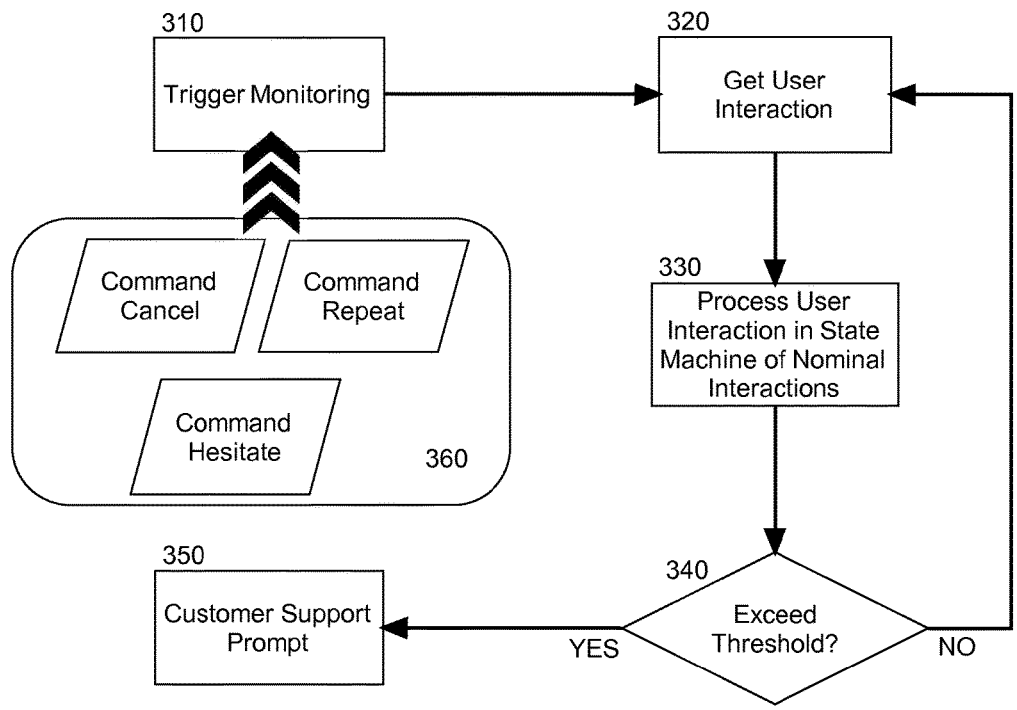

In even yet further illustration of the operation of the smart user feedback 300, FIG. 3 is a flow chart illustrating a process for smart user feedback. Beginning in block 310, monitoring of an end user interactions with an application are triggered in response to detecting one or more triggering events 360, for example a repeated request to cancel an already directed command in the application, a repeated request to direct a command in the application, or an unusually long delay in receiving an directed command by the end user in the application. In response, in block 320 an end user interaction with the application is received.

In block 330, the user interaction is included in a list of already received user interactions in a state machine so as to compare the list of already received user interactions and the most recently received user interaction with a set of nominal user interactions. In decision block 340, to the extent that the state machine indicates a threshold variance between the list of already received user interactions and the most recently received user interaction, in block 350 a customer support prompt is issued in the application so as to proactively remediate a perceived usability experience of the end user.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

I claim:

1. A method for smart user feedback comprising:
monitoring different sequences of interactions with an application by multiple different end users, identifying common ones of the sequences as nominal interactions for the application and storing the nominal interactions as a set of nominal end user interactions in fixed storage;
subsequent to the storing, loading into memory of a computer hosting execution of the application, the set of nominal end user interactions with the application;

detecting a trigger event comprising an event selected from the group consisting of a contemporaneous end user consuming too much time without commanding the application, a contemporaneous end user repeatedly aborting a command in the application, and a contemporaneous end user repeating a same command in the application; and, responsive to the detection of the trigger event, monitoring interactions with the application by the contemporaneous end user, comparing the monitored interactions with the set of nominal end user interactions in order to compute a variance and, on condition that the variance computed for the monitored interactions exceeds a threshold, displaying a prompt in a display of the application in the computer recommending an initiation of a customer support session for the contemporaneous end user.

2. A data processing configured for smart user feedback comprising:

a host computing system comprising one or more computers, each with memory and at least one processor;

an application executing in the host computing system; and, a smart user feedback module coupled to the application, the module comprising program code enabled to:

monitor different sequences of interactions with an application by multiple different end users, identify common ones of the sequences as nominal interactions for the application and store the nominal interactions as a set of nominal end user interactions in fixed storage;

subsequent to the storing, load into the memory of the host computing system the set of nominal end user interactions with the application, to detect a trigger event comprising an event selected from the group consisting of a contemporaneous end user consuming too much time without commanding the application, a contemporaneous end user repeatedly aborting a command in the application, and a contemporaneous end user repeating a same command in the application; and to respond to the detection of the trigger event, by monitoring interactions with the application by the contemporaneous end user, to compare the monitored interactions with the set of nominal end user interactions in order to compute a variance and to respond to the variance computed for the monitored interactions exceeding a threshold value, by displaying a prompt in a display of the application in the computer recommending an initiation of a customer support session for the contemporaneous end user.

3. A computer program product for smart user feedback, the computer program product comprising a computer readable storage medium having program instructions embodied therewith, the program instructions executable by a device to cause the device to perform a method comprising:

monitoring different sequences of interactions with an application by multiple different end users, identifying common ones of the sequences as nominal interactions for the application and storing the nominal interactions as a set of nominal end user interactions in fixed storage;

subsequent to the storing, loading into memory of a computer hosting execution of the application, the set of nominal end user interactions with the application;

detecting a trigger event comprising an event selected from the group consisting of a contemporaneous end user consuming too much time without commanding the application, a contemporaneous end user repeatedly aborting a command in the application, and a contemporaneous end user repeating a same command in the application; and, responsive to the detection of the trigger event, monitoring interactions with the application by the contemporaneous end user, comparing the monitored interactions with the set of nominal end user interactions in order to compute a variance and, on condition that the variance computed for the monitored interactions exceeds a threshold, displaying a prompt in a display of the application in the computer recommending an initiation of a customer support session for the contemporaneous end user.

* * * * *